United States Patent

[11] 3,581,708

| [72] | Inventors | James W. Beck<br>601 Milnes Road;<br>William B. Beck, 333 Signal Road, Newport Beach, Calif. 92660 |
|---|---|---|
| [21] | Appl. No. | 803,341 |
| [22] | Filed | Feb. 28, 1969 |
| [45] | Patented | June 1, 1971 |

[54] FOLDING ANIMAL HOUSE
6 Claims, 15 Drawing Figs.

[52] U.S. Cl. .................................................. 119/19,
229/8, 46/11, 119/23
[51] Int. Cl. .............................................. A01k 01/02
[50] Field of Search ........................................... 119/15, 19,
23; 229/6, 8, 17, 31; 46/11, 21

[56] References Cited
UNITED STATES PATENTS

| 877,951 | 2/1908 | Roberts | 229/8.5 |
| 2,424,733 | 7/1947 | Benson | 119/23 |
| 2,666,414 | 1/1954 | Burr et al. | 119/23 |
| 3,134,708 | 5/1964 | Lohnes | 229/8 |
| 3,250,249 | 5/1966 | Nelson et al. | 119/23 |
| 3,280,796 | 10/1966 | Hatcher | 119/19 |
| 3,324,831 | 6/1967 | St. Onge | 119/19 |
| 3,335,922 | 8/1967 | Leff | 229/17X |

*Primary Examiner*—Aldrich F. Medbery
*Attorney*—Beaman & Beaman

ABSTRACT: The invention pertains to a house structure, particularly suitable for animals and pets, which is of a relatively small size and may be folded into a flat configuration for storage, handling and shipping, and may be easily unfolded into a usable shelter configuration. The house may be constructed of inexpensive materials, such as paperboard or the like, and includes structural features which strengthen the house when unfolded to a usable configuration, and lock the house in the unfolded condition.

PATENTED JUN 1 1971

INVENTORS
JAMES W. BECK
WILLIAM B. BECK
BY *Beaman & Beaman*
ATTORNEYS

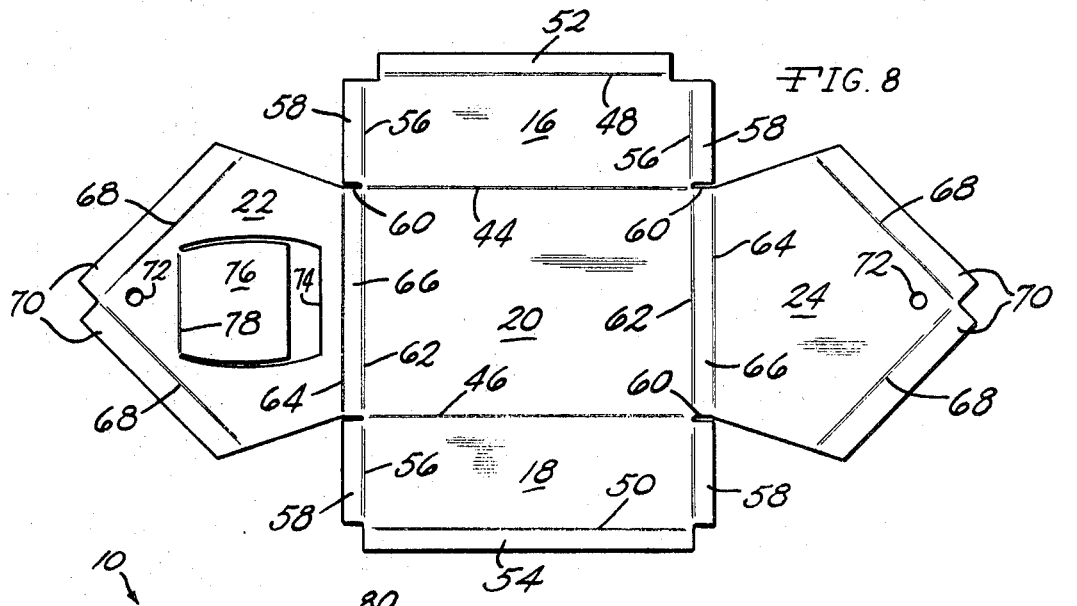
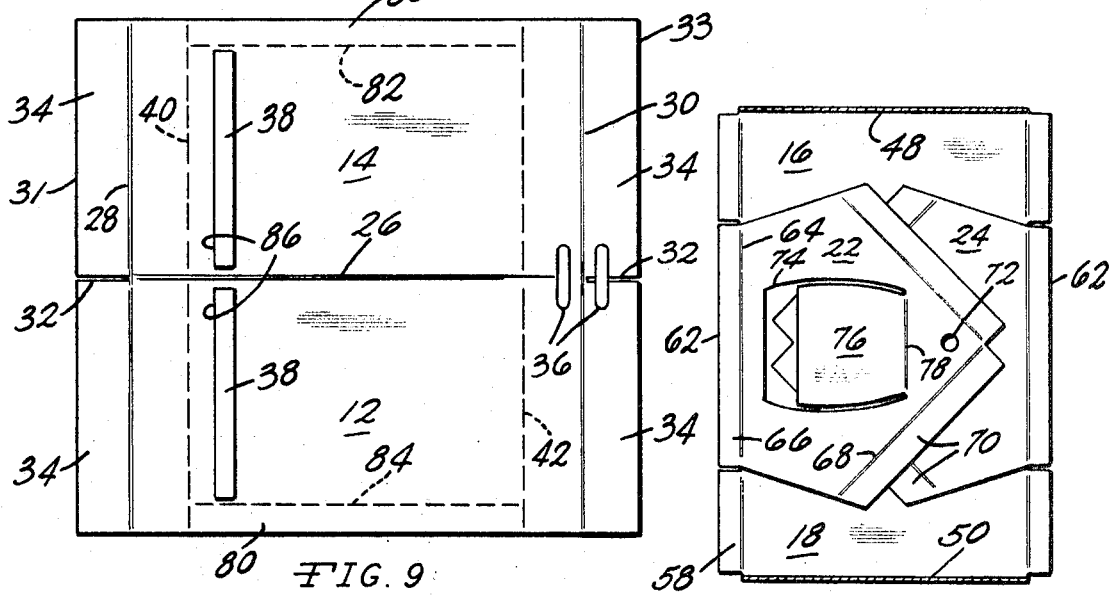
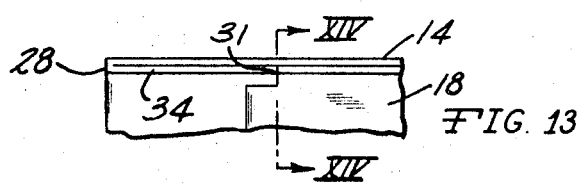
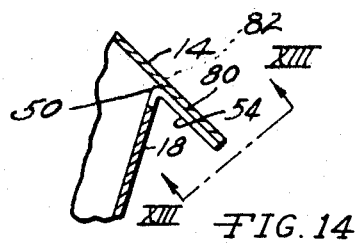

FOLDING ANIMAL HOUSE

BACKGROUND OF THE INVENTION

The invention pertains to the art of small prefabricated housing structures wherein the house is constructed in plurality of components hinged together as to be folded between a storage and handling configuration, and a usable house configuration, such houses being particularly suitable for use as animal houses, such as a dog house.

Most housing structures, even of relatively small size, such as used as animal houses, doghouses, cat houses and children's playhouses, are of such a bulky configuration as to render storage, handling and shipping most difficult. Accordingly, such small houses are usually not shippable, and must be produced on a local basis using limited production techniques. Usually, doghouses and the like are built on a substantially "custom" basis which results in a relatively high cost and limited source of manufacture.

It is known to provide small house structures which are of a "knock-down" type wherein the components defining the house may be disassembled for shipping, storage and handling purposes. However, prior constructions of this type are relatively complicated, requiring considerable skill by the assembler, and often require packages of a size greater than that which is readily handled. Reference is made to U.S. Pat. Nos. 2,020,196, 2,019,231, 2,445,055 and 3,016,042 as showing prefabricated assemblable houses. While the aforementioned patents disclose some of the advantages of a collapsible and folding house, the cost, operation, and structural relationship of the apparatus shown in these patents leaves much to be desired in producing a low-cost housing structure which can be readily marketed through conventional retail outlets, such as supermarkets and the like.

SUMMARY OF THE INVENTION

It is an object of the invention to provide a small housing structure which is suitable for use as an animal house, doghouse, cat house, or playhouse for children. The house in accord with the invention is preferably formed of flat sheet material, such as a high density paperboard, fiberboard, or the like, wherein the components of the house are hinged together to form a unitary construction capable of being folded into a flat configuration for storage, handling and shipping purposes, and which may be readily unfolded to a usable condition by an unskilled person in a very short time.

Furthermore, it is one of the purposes of the invention to provide a small housing structure having a unique dimensional relationship between the various components as to permit the house to be folded to a flat configuration, and when the apparatus is unfolded to the usable condition an attractive and practical house form results.

Basically, the house includes a hinged roof consisting of a pair of roof portions, which are hinged to a sheet defining a bottom portion and sidewall portions. Each of the sidewalls is hinged to a roof portion, and the distance as measured along the roof portions between the hinged lines occurring at the sidewall and roof portions is equal to the distance between these same hinged lines as measured along the sidewalls and floor portion. Thus, the roof portions may be folded to a coplanar relationship, which results in the floor and sidewall portions also assuming a coplanar relationship adjacent and substantially parallel to the roof portions. End wall portions are hingedly connected to the bottom wall portion sheet and fold in between the planes of the roof portions and bottom portion when the housing structure is in a folded condition. Upon unfolding the house to a usable condition, the end walls are related in a direction perpendicular to the plane of the bottom portion and cooperate with abutment and locking means defined in the roof portion whereby a usable house is formed. An ingress and egress opening is defined in at least one of the end portions to permit access to the interior of the house structure.

In that it is desirable to form the house of an inexpensive sheet material, such as a high density paperboard, the sheet material utilized in the construction of the invention is folded at a number of locations for strength and appearance purposes, and compressed along hinge lines wherein the hinging occurs in the material of the housing and does not require the use of separate hinge or pivot devices.

An additional object of the invention is to provide a housing for animals and the like which may be readily constructed of economical materials, and may be folded to a concise configuration, yet forms a strong rigid housing when unfolded to define a usable structure.

DESCRIPTION OF THE DRAWINGS

The aforementioned objects and purposes of the invention will be appreciated from the following description and accompanying drawings wherein:

FIG. 8 is a plan view of sheet blank, per se, forming the bottom, sidewall and end wall portions, FIG. 9 is a plan view of the underside of the sheet blank forming the roof portions in accord with the invention.

FIG. 13 is an enlarged, elevational detail view as taken along Section XIII-XIII of FIG. 14, FIG. 14 is an elevational, detail, sectional view taken through a sidewall and roof portions along Section XIV-XIV of FIG. 13, and FIG. 15 is a sectional, plan view illustrating the relationship of the bottom, sidewall and end wall components when in the folded condition as taken along Section XV-XV of FIG. 7.

DESCRIPTION OF THE PREFERRED EMBODIMENT

Figure 1:
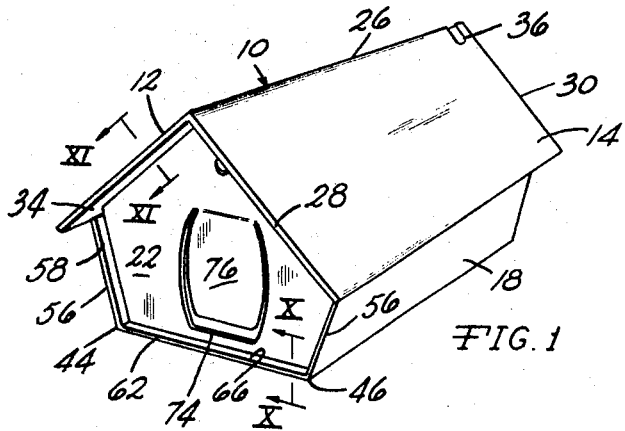
FIG. 1 is a perspective view of the housing structure in accord with the invention in the unfolded configuration.
Figure 3:
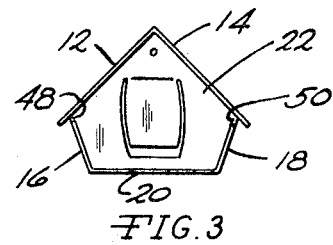
FIG. 3 is a front elevational view.
Figure 2:
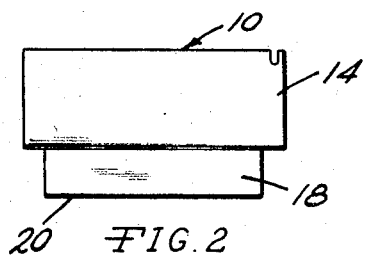
FIG. 2 is a side elevational view of the house in the unfolded condition.
Figure 4:
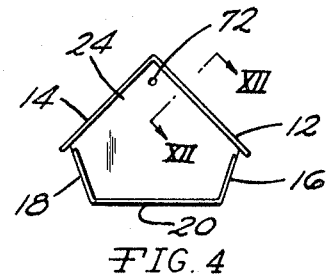
FIG. 4 is a rear elevational view of the unfolded house.

As indicated above, the house structure which is formed by the practice of the invention is particularly suitable for use with animals, such as pets, and the preferred embodiment of the invention lies in its use as a doghouse. Of course, the concepts of the invention can be employed in the forming of houses for other purposes, such as for children's play houses, or the like. The disclosed embodiment is particularly suitable for a dog or cat house.

Preferably, the house in accord with the invention is constructed of a lightweight, economical and substantially rigid sheet material which is capable of having integral hinge lines defined therein. The material may consist of cardboard, fiberboard, paperboard, paperboard coated with plastic or metal foil or film, or the like. The material used in the formation of the house is in sheet form, and the thickness thereof may vary depending upon the cost, weight and strength characteristics desired.

Basically, the housing structure consists of a roof 10 defined by a pair of roof portions 12 and 14 which are associated with and supported by sidewall portions 16 and 18, respectively, in turn connected to a bottom portion 20, and the ends of the housing structure are defined by a front end wall portion 22 and a rear end wall portion 24.

The roof 10 may be formed of a single piece of sheet material, FIG. 9, which is of a rectangular configuration. The longitudinal central region of the roof sheet is compressed to define a hinge line 26 which forms the ridge of the roof and defines roof portions 12 and 14. Hinge lines 28 and 30 are defined across the width of the roof sheet perpendicular to the hinge line 26, and set inwardly from the sheet end edges 31 and 33 respectively, as to be parallel thereto. The sheet is notched at 32 to define portions 34, and oval hand holes 36 may be cut or scored on dotted lines into the sheet at locations equally spaced from the hinge line 30 for easy carrying and locking with the house in the folded condition. A pair of elongated locking ribs 38 are cemented to the underside of the roof sheet parallel to the hinge line 28 for a purpose that will be later described.

In forming the roof 10, the portions 34 are folded inwardly on the hinge lines 28 and 30 whereby the end edges 31 and 33 will be located on the dotted lines represented at 40 and 42. This relationship will be apparent from FIGS. 11 and 12. In os folding the portions 34 the right-hand hole 36 will coincide with the left-hand hole 36, and it will be noted that a predetermined parallel spacing exists between the left end edge 31, FIG. 9, when folded on a roof portion, and the locking ribs 38.

The bottom or floor portion 20, and the sidewall and end wall portions 16, 18, 22 and 24 may be formed from a single blank which is of a configuration as illustrated including the bottom portion 20, the sidewall portions 16 and 18, and the end wall portions 22 and 24. Hinge lines 44 and 46 are defined in spaced relation on the material to define the lateral edges of the bottom portion 20 and form a hinged interconnection between the bottom portion and the sidewall portions 16 and 18. The sidewall portions 16 and 18 include lateral free end regions defined by hinge lines 48 and 50 and rectangular tab portions 52 and 54. The end regions of the sidewall portions are defined by hinge lines 56 which form tabs 58 which are adapted to be folded back upon the wall portions 16 and 18, as will be apparent in FIG. 1. The sheet material is notched at 60 to permit such a folding back of the ribs 58.

Figure 10:
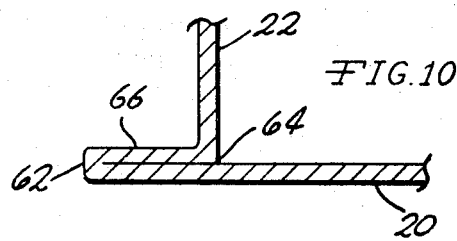
FIG. 10 is an enlarged sectional view of the folded edge of the bottom portion, and an end wall, as taken along Section X-X of FIG. 1.

The transition between the bottom portion 20 and the end wall portions 22 and 24 includes hinge lines 62 and 64 integrally formed in the material defining portions 66 which are to be folded back upon the bottom portion 20, FIG. 10. It will be noted that the notches 60 permit such a folding back of the portions 66.

Figure 11:
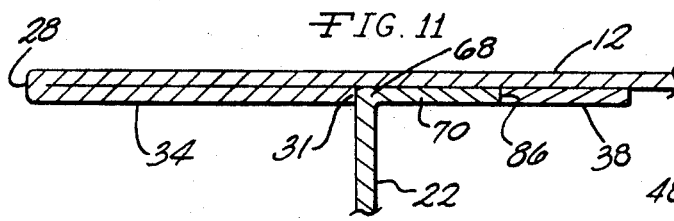
FIG. 11 is enlarged, elevational, sectional view of the roof portion and abutment and locking means of the roof portion and front end wall as taken along Section XI-XI of FIG. 1.

The end wall portions 22 and 24 include hinge lines 68 to define flaps 70 which, in the operative condition are disposed at right angles to the plane of the associated end wall, FIG. 11. Each of the end walls may include a small finger hole 72 which serves to facilitate unfolding of the house, and which also provides ventilation. In the illustrated embodiment the ingress and egress opening to the house is illustrated at 74 in the front wall 22 and is partially closed by the flap closure 76 hingedly connected to the associated end wall at hinge line 78. The lower cutout portion of the opening 74 is folded over inside the house to give double support to the wall 22 beneath the opening.

The bottom and sidewall sheet is cemented to the roof portion sheet by applying adhesive to the tabs 52 and 54, and cementing the tabs to the portions 80 shown in FIG. 9 and bounded by dotted lines whereby hinge 44 is disposed adjacent line 82 and hinge 50 is disposed adjacent line 84. This relationship is also illustrated in FIGS. 13 and 14.

Figure 5:
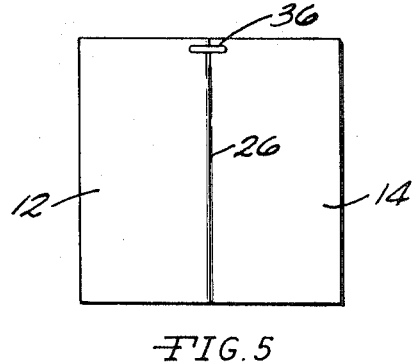
FIG. 5 is a top plan view of the house components when in the folded condition.
Figure 6:
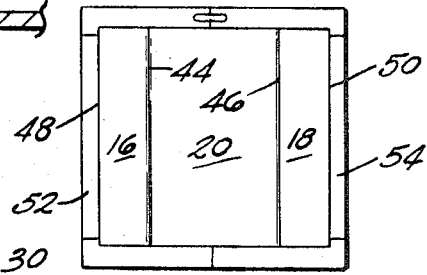
FIG. 6 is a bottom plan view of the house components in the folded condition, FIG. 7 s is a side elevational view of the house in the folded condition.
Figure 7:
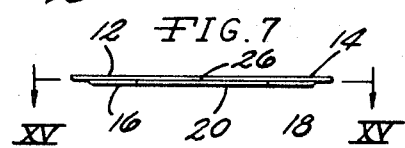

With the sheets of FIGS. 8 and 9 bonded together as described above, and with the end wall portions overlapping as illustrated in FIG. 15, a flat folded configuration of the house is produced, as represented in FIGS. 5 through 7. The flat folded configuration is possible because the distance between the hinge lines 48 and 50 as measured on the sidewall portions 16 and 18, and bottom portion 20, when in a planar condition, is equal to the distance between the lines 82 and 84 as represented in FIG. 9 when the roof sheet is in a flat condition. Thus, as the sum of the distances between lines 82 and 84, FIG. 9 and the hinge line 26 is equal to the sum of the distances between hinge lines 44 and 48 and the hinge lines 46 and 50, and the distance between hinge lines 44 and 46 across the floor portion 20, the house of the invention may be folded to a flat configuration wherein the planes of the two sheets of material are substantially parallel and adjacent each other and the folded end wall portions 22 and 24 are located between the floor portion 20 and the roof portions 12 and 14, FIG. 15.

When it is desired to unfold the house to a usable condition, it is merely necessary to "open" the roof portions and the bottom portion sufficiently to grasp the end walls by means of finger holes 72. With the end walls folded as in FIG. 15 the end wall 22 is on "top" and by inserting a finger in opening 72 the wall 22 is pivoted to its operative condition first. Upon grasping the front end wall 22 through the finger opening the end wall is pivoted to a relationship along hinge line 64 wherein the plane of the end wall is perpendicular to the plane of the bottom portion 20. The desired location of the front end wall is achieved by bringing the end wall into engagement with the edges 31 of the roof portions 34, and the end edges of the tabs 58 adjacent end wall 22. In that these abutment edges are related in a coplanar manner which corresponds to the plane in which the hinge line 64 lies, a tight engagement with the portions 34 and 58 occurs, as will be appreciated from FIG. 11. With the front end wall engaging the abutment edge 31 the flaps 70 of the front wall are received within the locking space defined between the edge 31 and the ribs 38, FIG. 11. Thus, the front end wall cannot be pivoted about the hinge line 64 in either direction until the flaps 70 are pulled out of engagement with the rib edge 86. This locking relationship prevents the front end wall 22 from being accidentally dislocated due to movement of the animal into or out of the house through the opening 74.

Figure 12:
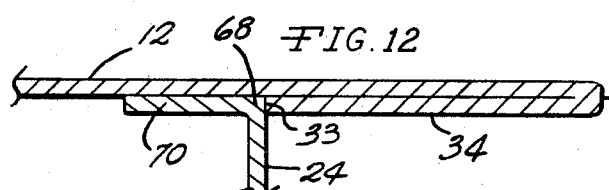
FIG. 12 is an enlarged, elevational, sectional view of the association of the rear end wall with a roof portion as taken along Section XII-XII of FIG. 4.

The rear end wall 24 is then pivoted about its hinge line 64 until the end wall engages the roof abutment edge 33, FIG. 12. In that it is not likely that significant outside force will be applied to the rear end wall 24 it is not usually necessary to use locking ribs with the end wall portion 24, and in the illustrated embodiment such rear end wall locking ribs are not shown. However, if desired, locking ribs, such as at 38, may also be affixed to the roof portions as to cooperate with the end wall portion 24 in a manner similar to the front wall portion 22. The dimensions of the various components of the house are closely maintained wherein a snug fit occurs between the end walls and the roof portions and sidewall portions. Thus, wind pressures and the like are not likely to displace the end wall portion 24 even though no locking ribs are employed.

After both of the end wall portions have been pivoted into the operative position as described above the unfolding of the house to a usable condition is completed, and the unfolding operation can be very quickly accomplished by an unskilled person in that the use of the abutment edges 31 and 33 prevents the end walls from being pulled beyond the desired location and, in effect the proper unfolding of the house is practically "foolproof."

If desired, anchoring stakes, or the like may be driven adjacent the house to stabilize its position on the ground or stakes could be driven through the portions 66 of the bottom portion 20 to position the doghouse on the ground.

Returning the house to a folded condition is readily accomplished by reversing the folding procedure. Thus, if it is desired to move the house to a different location, or transport the same the folding feature of the house is highly advantageous.

In that the house of the invention may be folded to a substantially flat configuration, and may be constructed of lightweight and economical materials, the house of the invention may be marketed through conventional outlets, such as supermarkets, and does not require extensive storage space. Also, in that the house may be easily unfolded to a usable condition no particular skills by the purchaser are required, and if it is desired to transport the house after once being unfolded, the refolding can be readily accomplished and the may be easily transported in automobiles and conventional vehicles without occupying significant volume.

By using economical sheet materials, such as paperboard, painting and decoration can be easily achieved by having such colors or decorations applied to the sheet material when manufactured.

It is appreciated that various modifications to the inventive concept may be apparent to those skilled in the art without departing from the spirit and scope thereof, and it is intended that the invention be defined only by the scope of the following claims:

We claim:

1. A house structure characterized by its ability to be folded into a substantially flat configuration comprising, in combination, a roof portion including first and second portions directly and integrally hinged together along a first hinge line, first and second sidewall portions, said wall portions each being hinged to a roof portion at second hinge lines and each being hinged to a common floor portion at third hinge lines, the sum of the distances defined on said roof portions from said second hinge lines to said first hinge line being equal to the sum of the distances defined on said sidewall portions from said second hinge lines to said third hinge lines plus the distance between said third hinge lines as defined on said floor portion, a pair of spaced end wall portions each hinged to said floor portion at fourth hinge lines adapted to be interposed between said roof, sidewall and floor portions for maintaining said floor and roof portions in spaced relationship to define a usable house structure, an inwardly folded flap portion defined on said roof portions at right angles to said first hinge line forming an edge; said end wall portions having a hinge adjacent ends opposite said fourth hinge line forming a flap upon said end wall portions maintaining said floor and roof portions in spaced relationship, said end wall portions hinge firmly abutting said edge of said folded flap portion, said flap being inwardly disposed adjacent the associated roof portion, and an ingress and egress opening defined in one of said end wall portions.

2. A house structure as in claim 1 wherein abutment means are defined on the interior of said roof portions abuttingly engaging said end wall portions.

3. A house structure as in claim 2 wherein a hinged locking flap is defined on said end wall portions, said abutment means on said roof portions including spaced abutment elements lockably receiving said flaps therebetween.

4. A house structure as in claim 1 wherein said first and second roof portions are formed of a single sheet of flat weather-resistant material and said first hinge line is integrally defined in said material.

5. A house structure characterized by its ability to be folded into a substantially flat configuration comprising, in combination, a roof defined by a single sheet of material having a centrally located roof hinge line defined therein defining a pair of flat roof portions together at said roof hinge line, a bottom and sidewall sheet of flat material having lateral ends, a central floor portion, and a sidewall portion hinged to said floor portion on each side thereof along parallel hinge lines, said lateral ends comprising the ends of said sidewall portions, means hinging said bottom and sidewall sheet lateral ends to said roof portions whereby a lateral end is associated with a single roof portion, the hinge line of said means being parallel to said roof hinge line and parallel to the hinge lines connecting said floor and sidewall portions, said lateral ends being hinged to said roof portions at locations such that upon said roof portions being disposed in a common plane said floor and sidewall portions are coplanar to each other and disposed in a plane substantially parallel to and adjacent the plane of said roof portion, a pair of spaced end wall portions each hinged to said floor portion at a hinge line adapted to be interposed between said roof, sidewall and floor portions for maintaining said floor and roof portions in spaced relationship to define a useable house structure, an inwardly folded flap portion defined on said roof portions at right angles to said roof hinge line forming an edge; said end wall portions having a hinge adjacent ends opposite said end wall portion hinge line forming a flap upon said end wall portions maintaining said floor and roof portions in spaced relationship, said end wall portions hinge firmly abutting said edge of said folded flap portion, said flap being inwardly disposed adjacent the associated roof portion.

6. A house structure as in claim 7 wherein said roof portion further includes a rib spaced from from said folded roof flap portion edge a distance equal to the width of the end wall portion flap to abuttingly receive said end wall portion flap, whereby one said end wall portion is locked in position relative to the roof, said one end wall portion being provided with a suitably sized ingress and egress opening.